US010871419B1

(12) United States Patent
Sydney (10) Patent No.: US 10,871,419 B1
(45) Date of Patent: Dec. 22, 2020

(54) MULTI-VORTEX WAKE GENERATOR HAVING FLUID FOILS FOR FLUID TUNNEL TESTING

(71) Applicant: The United States of America, as represented by the Secretary of the Navy, Arlington, VA (US)

(72) Inventor: Anish J. Sydney, Arlington, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 64 days.

(21) Appl. No.: 15/885,461

(22) Filed: Jan. 31, 2018

(51) Int. Cl.
*G01M 9/06* (2006.01)
*G01M 10/00* (2006.01)

(52) U.S. Cl.
CPC ............ *G01M 9/065* (2013.01); *G01M 10/00* (2013.01)

(58) Field of Classification Search
CPC .......... G01M 9/065; G01M 9/00; G01M 9/02; G01M 9/06; G01M 9/062; G01M 9/067; G01M 9/08; G01M 10/00; G01P 5/06; G01P 5/00; G01P 13/004; G01P 13/025; G01C 19/14
See application file for complete search history.

(56) References Cited

U.S. PATENT DOCUMENTS

| | | |
|---|---|---|
| 4,576,549 A | 3/1986 | Lanier |
| 5,158,251 A | 10/1992 | Taylor |
| 5,634,613 A | 6/1997 | McCarthy |
| 6,171,159 B1 | 1/2001 | Shen et al. |
| 7,059,566 B2 | 6/2006 | Byers et al. |
| D667,373 S | 9/2012 | Praskovsky et al. |
| 8,616,494 B2 | 12/2013 | Neitzke et al. |
| 8,651,813 B2 * | 2/2014 | Long .................. B63B 35/7926 416/90 A |

(Continued)

OTHER PUBLICATIONS

Anish J. Sydney, Joseph P. Ramsey, and Joseph I. Milluzzo, "Time-Resolved PIV Measurements of Ship Motion and Orientation Effects on Airwake Development", AIAA Aviation Forum 2017, 35th AIAA Applied Aerodynamics Conference, Jun. 5-9, 2017, Denver, CO.

(Continued)

*Primary Examiner* — Harshad R Patel
*Assistant Examiner* — Nigel H Plumb
(74) *Attorney, Agent, or Firm* — Howard Kaiser (57) ABSTRACT

A fluid-dynamic test device is implementable in a fluid tunnel such as a wind tunnel or water tunnel. The exemplary inventive device features an outer case and four foils connected to and projecting inward from the case, wherein each foil is rotatable about its spanwise axis and is thus positionable at a selected angle of attack with respect to current generated in the tunnel. The respective axes or span-lines of the four foils lie in a vertical geometric plane in a crisscross configuration, each axis/span-line directed inward toward the point in the vertical plane that is centric relative to the case. Two axes/span-lines are aligned in a horizontal direction, and two axes/span-lines are aligned in a vertical direction. Generated current passes through the inventive device at perpendiculars to the vertical plane, thereby forming a wake that is predominately characterized by mutually interactive tip vortices corresponding to the four foils.

19 Claims, 10 Drawing Sheets

(56) References Cited

U.S. PATENT DOCUMENTS

| | | | |
|---|---|---|---|
| 9,022,738 | B1 | 5/2015 | Silberg et al. |
| 9,488,064 | B2 | 11/2016 | Perrot et al. |
| 9,650,124 | B2 | 5/2017 | Neitzke et al. |
| 9,677,968 | B2 | 6/2017 | Griffiths et al. |
| 9,863,840 | B1 | 1/2018 | Beckman et al. |
| 10,465,652 | B2 | 11/2019 | Wetzel et al. |
| 10,648,882 | B2 | 5/2020 | Pickl et al. |
| 10,677,066 | B2 | 6/2020 | Lewis et al. |
| 10,730,611 | B2 | 8/2020 | Utt |
| 10,732,074 | B1 | 8/2020 | Beckman et al. |
| 2008/0175709 | A1* | 7/2008 | Akcasu ............... F03B 17/065 416/131 |
| 2020/0001982 | A1 | 1/2020 | Utt |
| 2020/0148322 | A1 | 5/2020 | Pekrul |
| 2020/0182145 | A1 | 6/2020 | Pekrul |

OTHER PUBLICATIONS

M.J. Emes, F. Ghanadi, M. Arjomandi, R.M. Kelso, Dept. of Mechanical Engineering, University of Adelaide, Adelaide, South Australia 5005, Australia, "An Experimental Technique for the Generation of Large-Scale Spanwise Vortices in a Wind Tunnel", 20th Australasian Fluid Mechanics Conference, Perth, Australia, Dec. 5-8, 2016.

Hojoon Shim, Jongsung Lee, Hoon Chae, and Seung-O Park, "Wake Characteristics of Vane-Type Vortex Generator," Proceedings of the 2nd World Congress on Momentum, Heat and Mass Transfer (MHMT '17), Barcelona, Spain, Apr. 6-8, 2017.

All-hands email, subject "All Hands—Oct. 31 Carderock ILIR/IAR Program Review," email sent by Margaret M. Zavarelli on behalf of the Carderock Public Affairs Office on Oct. 25, 2016 at 9:05 am, Naval Surface Warfare Center, Carderock Division (NSWCCD), West Bethesda, Maryland (one-page email is submitted herewith; email attachments are not submitted herewith).

All-hands email, subject "Carderock ILIR/IAR Program Review," email sent by Kevin D. Sykes on behalf of the Carderock Public Affairs Office on Oct. 27, 2016 at 3:58 pm, Naval Surface Warfare Center, Carderock Division (NSWCCD), West Bethesda, Maryland (one-page email is submitted herewith; email attachments are not submitted herewith).

Hojoon Shim, Young-Hee Jo, Kyoungsik Chang, Ki-Jung Kwon, and Seung-O Park, "Wake Characteristics of Vane-Type Vortex Generators in a Flat Plate Laminar Boundary Layer," International Journal of Aeronautical and Space Sciences 16(3), 325-338 (2015), The Korean Society for Aeronautical & Space Sciences.

David J. Hass, Eric J. Silberg, and Kevin R. Kimmel, "The Navy's Aerodynamics Laboratory—100 Years of Experimental Aerodynamics from A-1 to DDG 1000," AIAA SciTech Forum Sciences Meeting, Jan. 13-17, 2014, National Harbor, MD. Copyright© 2014 by David J. Haas, Eric J. Silberg, and Kevin R. Kimmel, Naval Surface Warfare Center, Carderock Division, West Bethesda, MD, 20817. Published by the American Institute of Aeronautics and Astronautics, Inc., with permission.

Nicholas C. Rosenfeld, Kevin R. Kimmel, and Anish J. Sydney, Naval Surface Warfare Center, Carderock Division, West Bethesda, MD, 20817, "Investigation of Ship Topside Modeling Practices for Wind Tunnel Experiments," AIAA Science and Technology Forum 2015, 53rd Aerospace Sciences Meeting, Jan. 5-9, 2015, Kissimmee, FL.

Anish J. Sydney, Joseph P. Ramsey, and Kevin R. Kimmel, Naval Surface Warfare Center, Carderock Division,West Bethesda, MD 20817. "Experimental Investigation of the Turbulent Aerodynamic Environment Produced by a Generic Ship", AIAA Science and Technology Forum 2016, 54th Aerospace Sciences Meeting, Jan. 4-8, 2016, San Diego, CA.

Anish Sydney, Peter Bi, and Minyee Jiang, poster entitled "Unsteady Behavior of Spatially displaced Vortices Generated by Perpendicular Lifting Surfaces," ILIR—Year 1/3, ILIR poster on display at the Naval Surface Warfare Center, Carderock Division (NSWCCD), West Bethesda, Maryland, NSWCCD In-House Laboratory Independent Research (ILIR) and Independent Applied Research (IAR) program review, Monday Oct. 31, 2016, Maritime Technology Information Center, poster review session 11:30 am—13:30 pm (one-page poster is submitted herewith).

* cited by examiner

MULTI-VORTEX WAKE GENERATOR HAVING FLUID FOILS FOR FLUID TUNNEL TESTING

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to fluid dynamics and fluid dynamic surfaces, more particularly to fluid dynamic (e.g., aerodynamic or hydrodynamic) testing of foils (e.g., airfoils or hydrofoils) and other structures with respect to generation of wakes characterized by plural vortices.

Wake vortex turbulence is a well-known phenomenon associated with movement of aircraft through air or of marine craft through water. Lifting surfaces (e.g., control surfaces on air vehicles or underwater vehicles) produce tip vortices and other flow features. The components of a turbulent fluid typically include tip (e.g., "wingtip") vortices. Fluid dynamic research is conducted experimentally (e.g., fluid tunnel testing via stereoscopic particle image velocimetry, or SPIV) and/or computationally (e.g., using computational fluid dynamics, or CFD).

Aerodynamicists and hydrodynamicists have studied in some detail the development, evolution, and breakdown of one vortex (such as a tip vortex produced by a blade) or a pair of vortices produced by a single high-aspect-ratio lifting surface (such as two wingtip vortices, produced by an aircraft wing). However, the introduction of one or more additional vortices (e.g., a third vortex, or third and fourth vortices) caused by one or more additional lifting surfaces creates a significantly more complex and turbulent downstream wake that is not as well understood. For instance, an aircraft can have a wing and at least one lifting surface perpendicular to the wing. If one is to consider a greater number of vortices (e.g., at least three vortices) of varying strengths and/or directions of rotation, this significantly complicates the interactions between and among the vortices and the development of the overall wake.

Previous designs of aircraft and marine vessels have typically been developed with an emphasis on understanding the behavior of specific platforms (e.g., aircraft and submarines), and have placed less importance on understanding the fundamental science behind the fluid dynamic interactions within the wake.

SUMMARY OF THE INVENTION

In view of the foregoing, an object of the present invention is to provide a new and improved methodology for testing and evaluating wakes generated due to fluid dynamic interactions with fluid foils, especially in terms of multiple vortices contained in the wakes. Exemplary embodiments of the present invention provide same wherein wind tunnels may be used to generate wakes via aerodynamic interactions with airfoils, or wherein water tunnels may be used to generate wakes via hydrodynamic interactions with hydrofoils.

Exemplary inventive practice provides an apparatus for fluid dynamic testing. The inventive apparatus includes four fluid foils and a housing for the four fluid foils. Each fluid foil is characterized by a fluid foil axis about which the fluid foil is pivotable. The housing is characterized by a Cartesian geometric plane having an x-axis and a y-axis that intersect at a center point. Two of the four fluid foils are situate whereby the corresponding fluid foil axis coincides with the x-axis. The other two of the four fluid foils are situate whereby the corresponding fluid foil axis coincides with the y-axis.

Each fluid foil of an exemplary inventive apparatus has a fluid foil tip and projects inward from the housing toward the center point, wherein the fluid foil tip is the nearest portion of the fluid foil to the center point, and wherein the corresponding fluid foil tips of the four fluid foils are at (at least approximately) the same distance from the center point. Each fluid foil is pivotable within a certain range, the selection of which depends on the inventive embodiment: within a range of 180° (e.g., half-circle); or within a range of less than of 180°; or within a range of 360° (e.g., full-circle); or within a range of greater than 180° and less than 360°.

As exemplarily embodied, the present invention meets a need to advance the fundamental understanding of the three-dimensional interactions of vortically dominated wakes produced by two perpendicular lifting surfaces. Fluid dynamics of this nature can have significant impact on current and future naval architecture. Experimental results inventively obtained can provide much needed physical understanding for development of analytical models and CFD simulations. As an example of inventive application, a generic perpendicular lifting surface model can be designed and characterized using CFD. This model can then be used to produce four tip vortices in a wind or water tunnel.

Exemplary embodiments of the present invention involve investigation of the unsteady behavior of wakes that include a third vertically displaced vortex or third and fourth vertically displaced vortices, particularly wherein at least two vortices are of varying strengths. Exemplary inventive practice advances understanding of the physics of a vortically dominated wake produced by low-aspect-ratio, perpendicular lifting surfaces. The present invention can be practiced to examine how vortex strength, direction of rotation, number of vortices, and spacing affect vortex development, persistence, trajectories, breakdown, and turbulent characteristics.

Exemplary practice of the present invention provides method and apparatus for computationally and/or experimentally examining the unique vortically dominated wakes produced by air and marine vehicles. The present inventors are especially interested in investigating multiple vortex wakes produced by certain naval vehicles. An inventive device, as exemplarily embodied, is capable of creating up to four line-type vortices (e.g., two horizontally displaced line-type vortices and two vertically displaced line-type vortices). An exemplary inventive device further features the ability to change the relative directions of rotation and the strengths of these line-type vortices.

Exemplary inventive practice admits of multifarious applications and is capable of generating a fundamentally different type of vortically dominated flow field than has previously been produced for model testing. An exemplary inventive apparatus is also conducive to model scale testing, as the vortices are relatively closely spaced and therefore will readily interact with one another.

The term "fluid tunnel" is used herein to broadly refer to any apparatus used for experimentation, testing, or modeling with respect to fluid dynamic behavior and/or effects of bodies moving through fluid and/or fluid flowing around bodies and/or other types of fluid-body interaction. A typical "fluid tunnel" is an experimental apparatus that produces wind or current formed of air, water, oil or other fluid, typically for purposes of evaluating fluid dynamics of an air vehicle or water vehicle having one or more lifting surfaces. The fluid can be liquid or gaseous and can vary in viscosity. Known genres of fluid tunnels include "wind (air) tunnel," "water tunnel," and "oil tunnel."

BRIEF DESCRIPTION OF THE DRAWINGS

The present invention will now be described, by way of example, with reference to the accompanying drawings, wherein like numbers indicate same or similar parts or components, and wherein:

FIG. 2 is an elevation view of an inventive embodiment of a multi-vortex wake generator such as that shown in FIG. 1. As depicted in FIG. 2, each foil is shown in an axial-longitudinal view, with a chord-wise perspective looking into the page, and is positioned at zero angle of attack (e.g., at zero angle relative to the direction of the air flow or water flow generated by a wind tunnel or water tunnel).

As illustrated in FIG. 3, each foil can be rotatively positioned at (e.g., continually or intermittently adjusted to) an angle of attack (e.g., angle relative to the wind or current) in a range between zero angle (0°) and right angle (90°).

FIGS. 17 and 18 illustrate by way of example the effects of vortex spacing.

FIGS. 19 and 20 illustrate by way of example the effects of vortex strength.

FIG. 21 is a three-dimensional computer-aided design (3D CAD) model and perspective view drawing of a different embodiment of a multi-vortex wake generator in accordance with the present invention.

FIG. 22 is an elevation view of an inventive embodiment of a multi-vortex wake generator such as that shown in FIG. 21. As depicted in FIG. 22, each foil is shown in an axial-longitudinal view, with a chord-wise perspective looking into the page, and is positioned at zero angle of attack (e.g., at zero angle relative to the direction of the air flow or water flow generated by a wind tunnel or water tunnel).

DESCRIPTION OF EXEMPLARY EMBODIMENTS OF THE INVENTION

Figure 1:
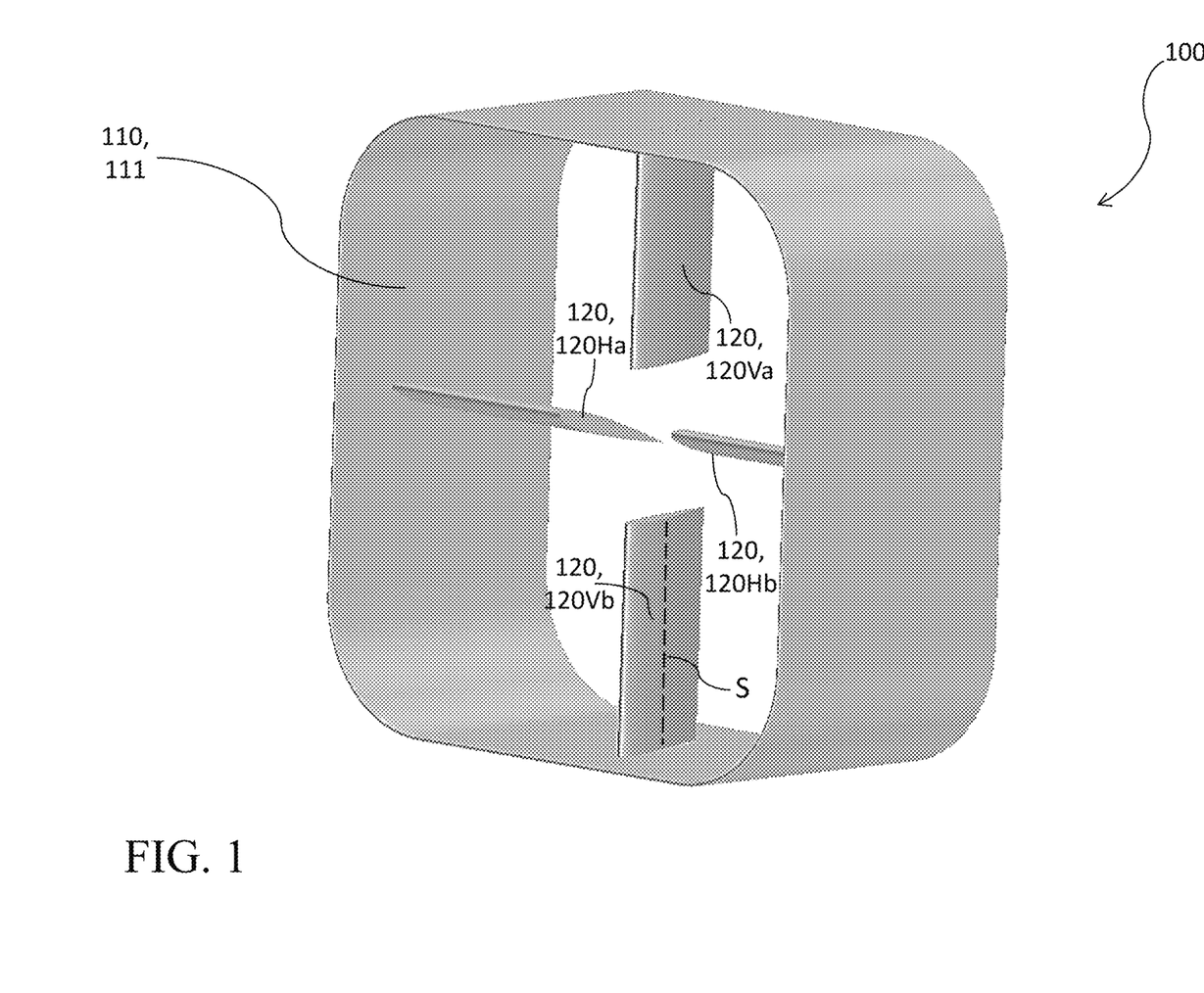
FIG. 1 is a three-dimensional computer-aided design (3D CAD) model and perspective view drawing of an embodiment of a multi-vortex wake generator in accordance with the present invention.
Figure 2:
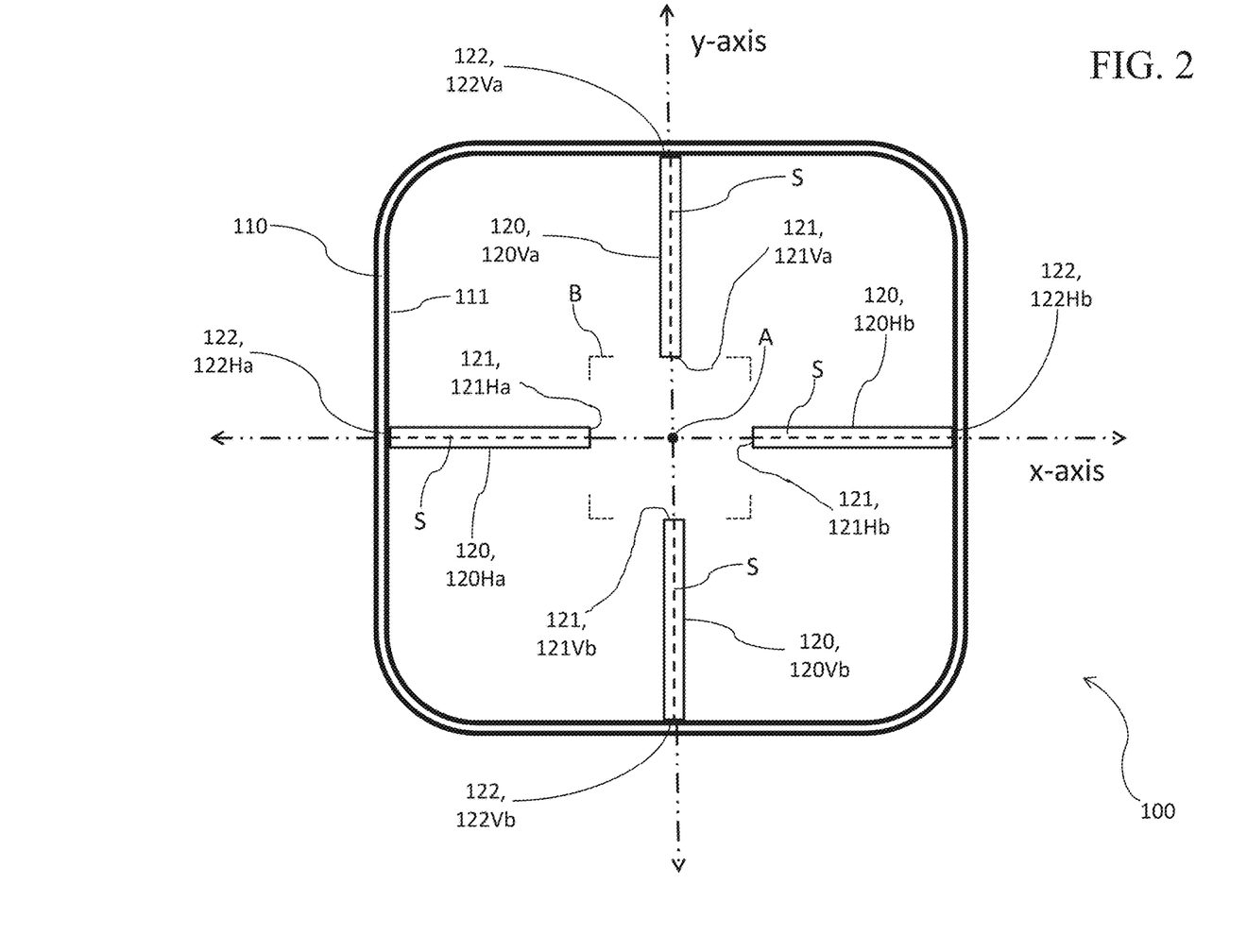

Referring now to FIGS. 1 and 2, inventive fluid-dynamic test device 100 includes a curvilinear substantially square prismatic exterior housing 110 and four fluid foils 120 attached to housing 110. The four foils 120 consist of two vertical foils and two horizontal foils. The two vertical foils are upper vertical foil 120Va and lower vertical foil 120Vb. The two horizontal foils are left horizontal foil 120Ha and right vertical foil 120Hb. Each foil 120 has a foil tip 121 and a foil root 122. Each foil 120 is connected at its root 122 to housing 110. Upper vertical foil 120Va has upper foil tip 121Va and upper foil root 122Va. Lower vertical foil 120Vb has lower foil tip 121Vb and lower foil root 122Vb. Left horizontal foil 120Ha has left foil tip 121Ha and left foil root 122Ha. Right horizontal foil 120Hb has right foil tip 121Hb and right foil root 122Hb.

As shown in FIG. 2, housing 110 is characterized by a geometric center A. Each of the four foils 120 has a foil span-line S, which extends between its foil tip 121 and its foil root 122. Each foil 121 protrudes inward, interior to housing 110. More specifically, each foil 120 projects from the inside surface 111 of housing 110 with its foil span-line S pointing in the direction of geometric center A. Each foil span-line S is coincident with either the x-axis or the y-axis of housing 110; two foil span-lines S coincide with the x-axis, and the other two foil span-lines S coincide with the y-axis. The four foil tips 121 are equidistant from geometric center A, and accordingly describe an inner geometric square B that is concentric with and similar to the generally square shape characterizing housing 110.

Figure 3:
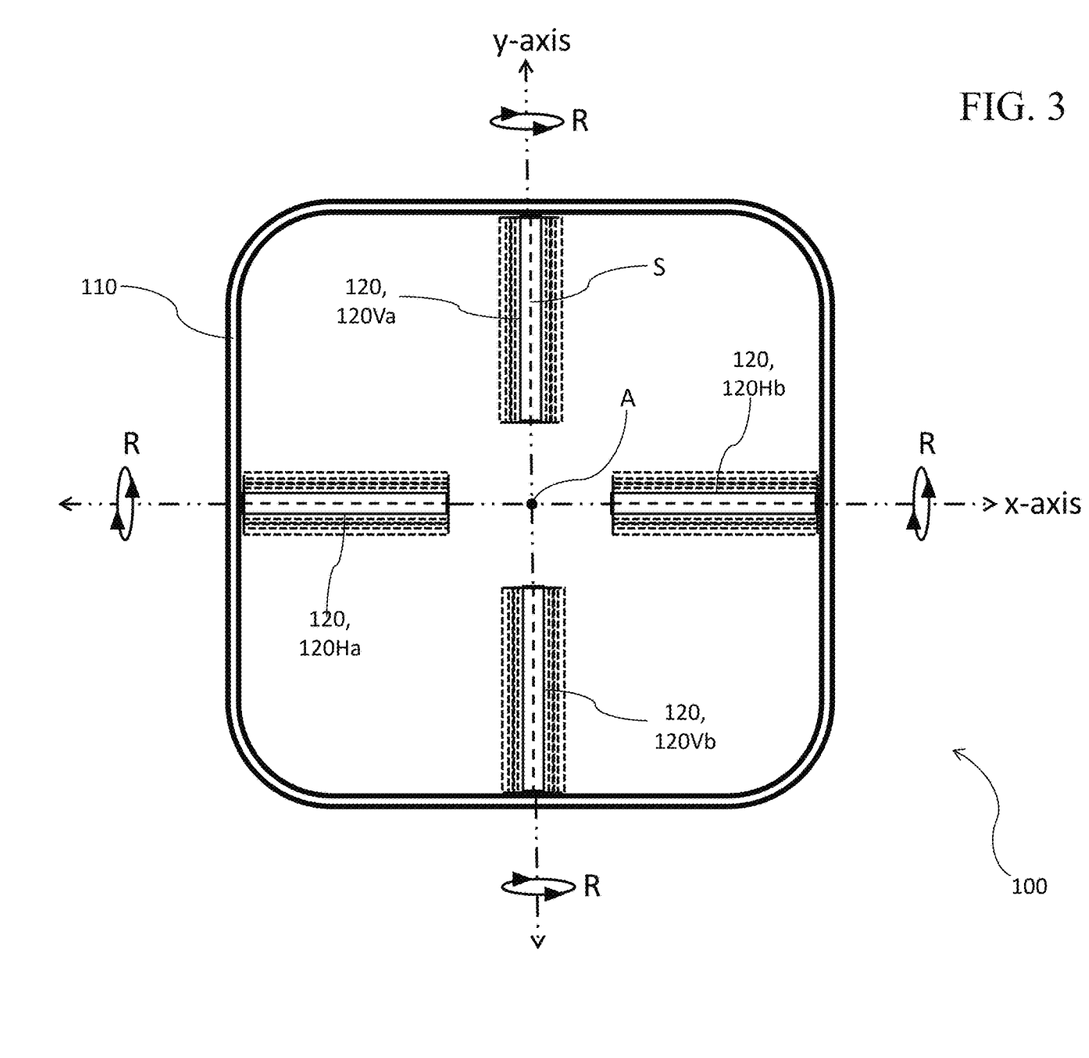
FIG. 3 is the view of the inventive embodiment shown in FIG. 2.
Figure 4:
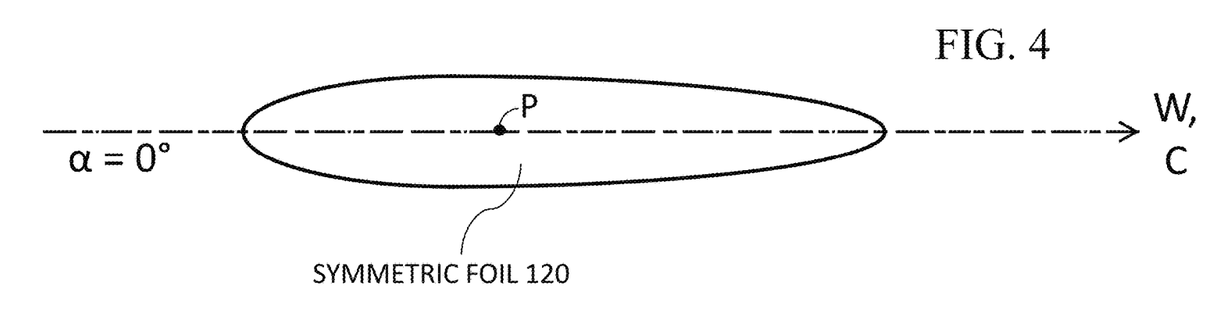
FIG. 4, FIG. 5, and FIG. 6 are similar views of an example of a single foil in accordance with the present invention. Each of the foils shown in FIGS. 4 through 6 is symmetric (e.g., axisymmetric) and is shown in a chord-wise view, with an axial-longitudinal perspective looking into the page.
Figure 5:
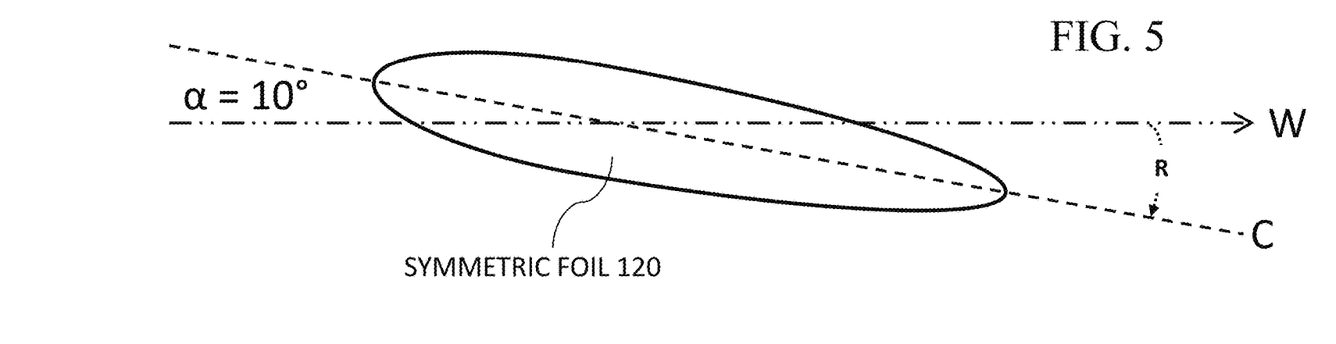
Figure 6:
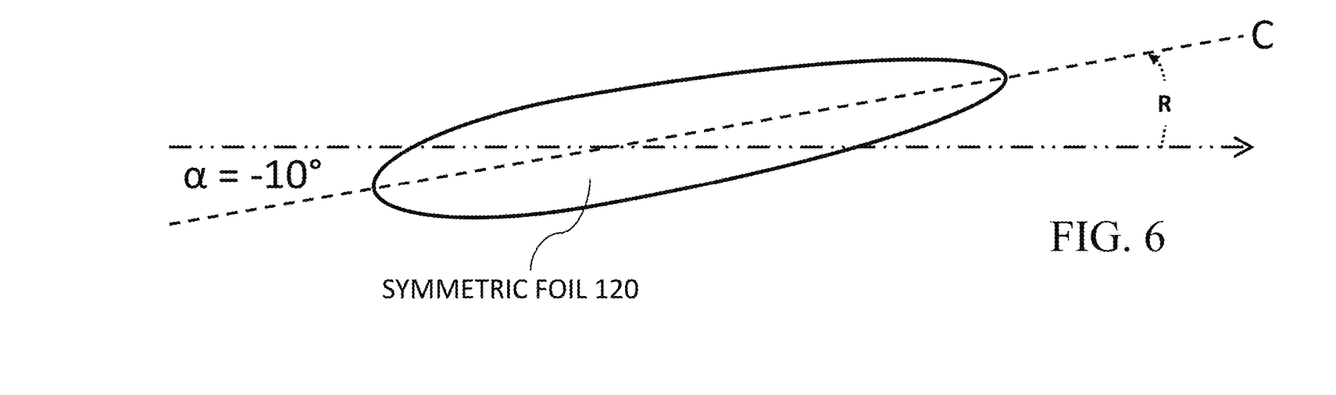
Figure 7:
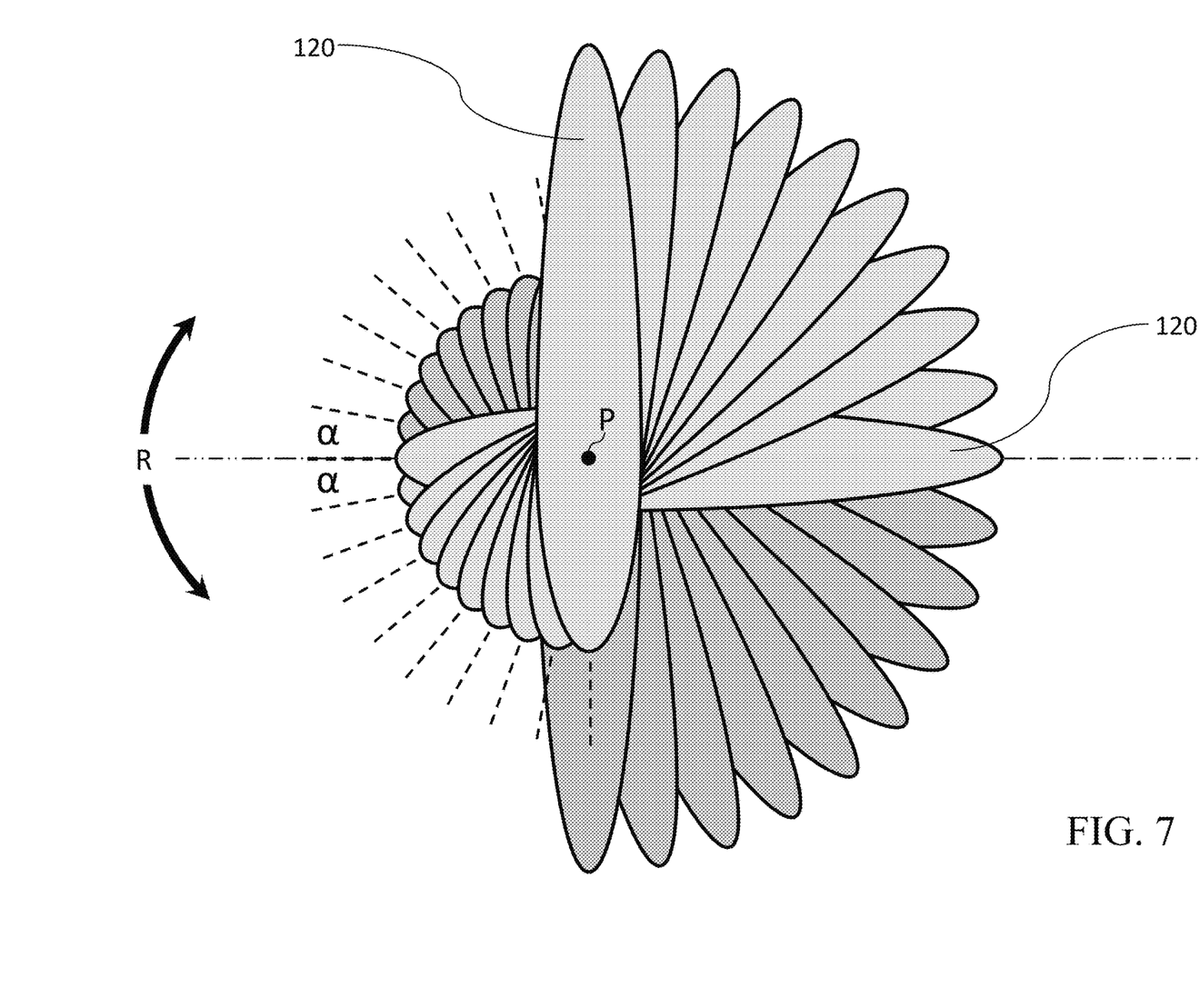
FIG. 7 is a view of a single foil, similar to the views of FIGS. 4 through 6, wherein the blade is shown to be rotatably positionable in a 180° range of angle of attack, between positive 90° and negative 90°, the range including therebetween acute positive and negative angles and 0° angle.

With reference to FIGS. 3 through 7, each foil 120 is rotatable about its axis, such as illustrated by rotational foil axis P in FIG. 4 and bidirectional rotation arrow R in FIGS. 3 and 7. Depending on the inventive embodiment, foil span-line S and foil axis P may be geometrically the same line or different lines. According to frequent inventive practice, foil span-line S and foil axis P are either parallel or coincident. FIGS. 4 through 7 depict various angles of attack α of foil 120's chord line C relative to the direction W of the fluid current generated in a wind tunnel, such as by means of a wind producer 400 diagrammatically represented in FIG. 16.

Depending on the inventive embodiment, a foil 120 can be designed to rotate in any range of values of angle α, and/or at any incremental value or values of angle α. For instance, an inventive device 100 can have four foils 120 that are each capable of pivoting 90 degrees, e.g., 45 degrees plus-or-minus from zero-angle α. Depending on the inventive embodiment, the range of angles α may be, for instance: 360 degrees (full-circle); 180 degrees (half-circle); 90 degrees (quarter-circle); greater than 180 degrees and less than 360 degrees; greater than 90 degrees and less than 180 degrees; or greater than 0 degrees and less than 90 degrees. As another example, investigators may be specifically interested in one or more values of angle α, and may thus provide an inventive device 100 that is specifically positionable at such value or values of angle α.

As exemplified herein, housing 110 is a substantially square prism, with curvature at the four corners of the square profile. A variety of shapes of housing 110 are possible in inventive practice. For instance, housing 110 can describe a geometric square prism that is perfectly square or nearly so, e.g., square prismatic having less or no curvature. Other examples of possible shapes for housing 110 include a triangular prism, a non-square rectangular prism, a pentagonal prism, a hexagonal prism, a heptagonal prism, an octagonal prism, a nonagonal prism, a decagonal prism, a cylinder, a cylindroid, an irregular shape having both linear and curved characteristics, etc. An often important consideration for exemplary inventive practice is that the housing 110 secure the four foils 120 in a cruciform arrangement and with rotational capabilities that are suitable for a contemplated practice of the present invention.

Figure 8:
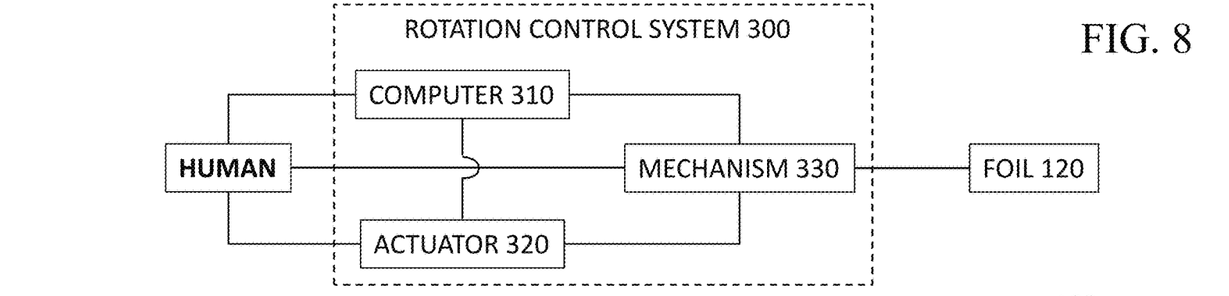
FIG. 8 is a schematic illustrating automated and/or manual control of the rotation of a foil.

FIG. 8 illustrates rotational control of a foil 120. A person interacts directly with a computer 310, or with an actuator 320, or with a rotating mechanism 330. Rotative mechanism 330 may include, for instance, an axle attached to foil 120 and turned by mechanism 330. A rotational system 300 can be set up in various ways. For instance, if a computer 310 is implemented, it may send digital signals to an actuator 320, which causes foil 120 to rotate via rotative mechanism 330. Alternatively, in the absence of a computer, a human may adjust controls on an actuator 310. According to some inventive embodiments, a human manually adjusts rotative mechanism 330. As another example, a rotative mechanism 330 may be stepped or ratcheted. Inventive practice utilizing electrical or electronic apparatus will usually require an electric power source (not shown in FIG. 8), e.g., alternating current or direct current (e.g., battery). In the light of the instant disclosure, a person of ordinary skill in the art will appreciate the various methods and techniques for rotating a foil 120 about its axis P with a requisite degree of precision for angular placement of foil 120.

Figure 10:
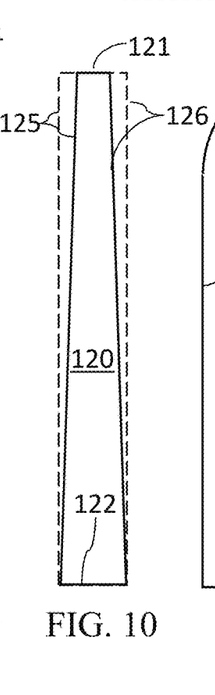
Figure 11:
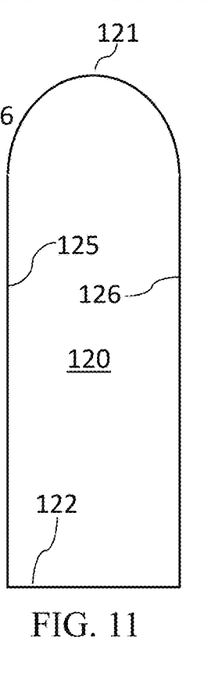
FIG. 11 and FIG. 12 are span-wise surface plan views of examples of foil shapes that may be used inventive practice.
Figures 12, 13, 14:
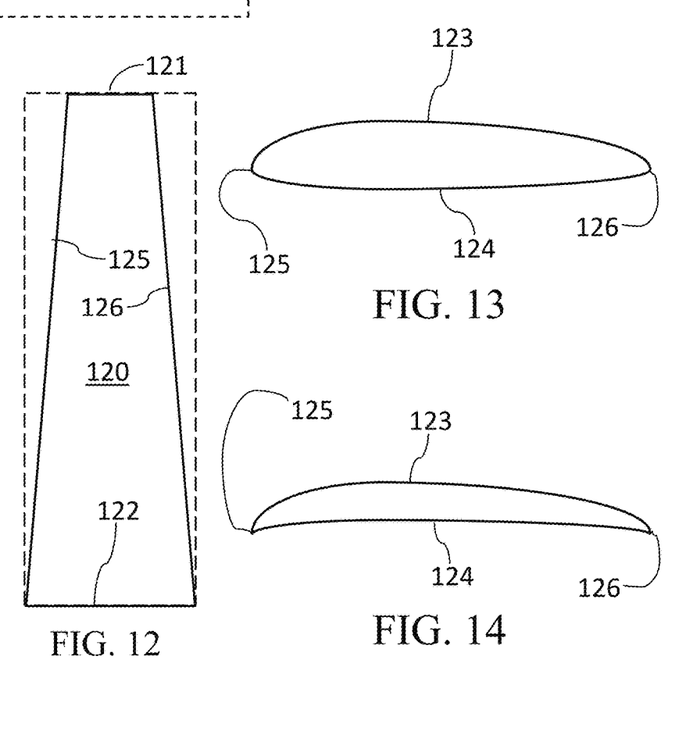
FIG. 13 and FIG. 14 are chord-wise tip views of examples of foil shapes that may be used in inventive practice.
Figure 15:
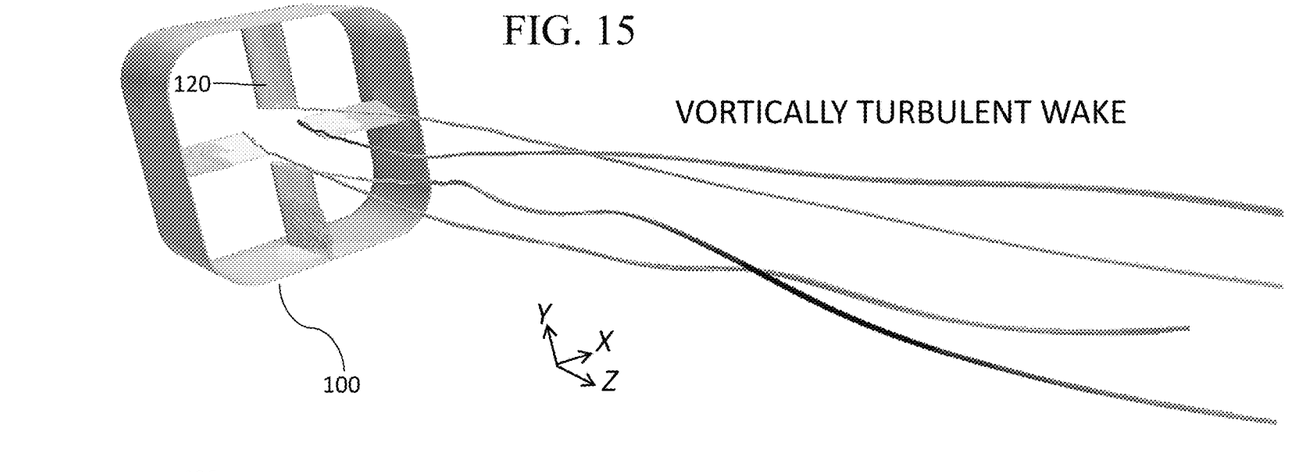
FIG. 15 is a diagram depicting generally and exemplarily the formation of a vortices-dominant wake resulting from wind or current generated by a fluid-tunnel apparatus and passing through an inventive device in the direction of its central axis A. The wake is characterized by the mutual interactions of four tip vortices.

Still referring to FIGS. 4 through 7 and also referring to FIGS. 9 through 14, fluid foil 120 has a foil tip 121, a foil root 122, an upper foil surface 123, a lower foil surface 124, a foil leading edge 125, and a foil trailing edge 126. Multifarious shapes of foils 120 are possible in inventive practice. An inventively implemented foil can be either symmetrical or non-symmetrical (e.g., cambered). FIGS. 4 through 7 depict an example of a symmetrical foil 120. FIGS. 13 and 14 depict two different examples of a cambered foil 120. A foil 120 can be, for example, rectilinear or curvilinear.

Figure 9:
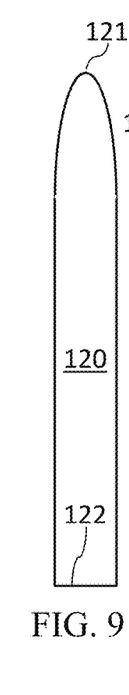
FIG. 9 and FIG. 10 are span-wise edge views of examples of foil shapes that may be used in inventive practice.

The edge-on views of FIG. 9 and FIG. 10 depict, respectively, a curvilinear foil tip 121 and a rectilinear foil tip 121. The respective shapes of upper surface 123 and lower surface 124 define the overall shape of foil 120 along its span-line S. FIG. 10 illustrates, in the same figure as alternative shapes, a rectangular shape and a trapezoidal shape. In a similar type of comparison, the plan views of FIGS. 11 and 12 depict, respectively, a curvilinear foil tip 121 and a rectilinear foil tip 121. FIG. 12 illustrates, in the same figure as alternative shapes, a rectangular shape and a trapezoidal shape.

As described herein, exemplary inventive practice implements four foils 120 in a cruciform-like arrangement. Other modes of inventive practice are possible in terms of the number of foils 120, e.g., an inventive device 100 including two foils, three foils, five foils, six foils, seven foils, etc. The ordinarily skilled artisan who reads the instant disclosure will appreciate that inventive principles are applicable to practically any plural number of fluid foils. According to exemplary practice of an inventive device in association with a fluid tunnel, a wake ensues that is characterized by formation of plural/multiple vortices concomitant with turbulent interaction of the vortices.

Figure 16:
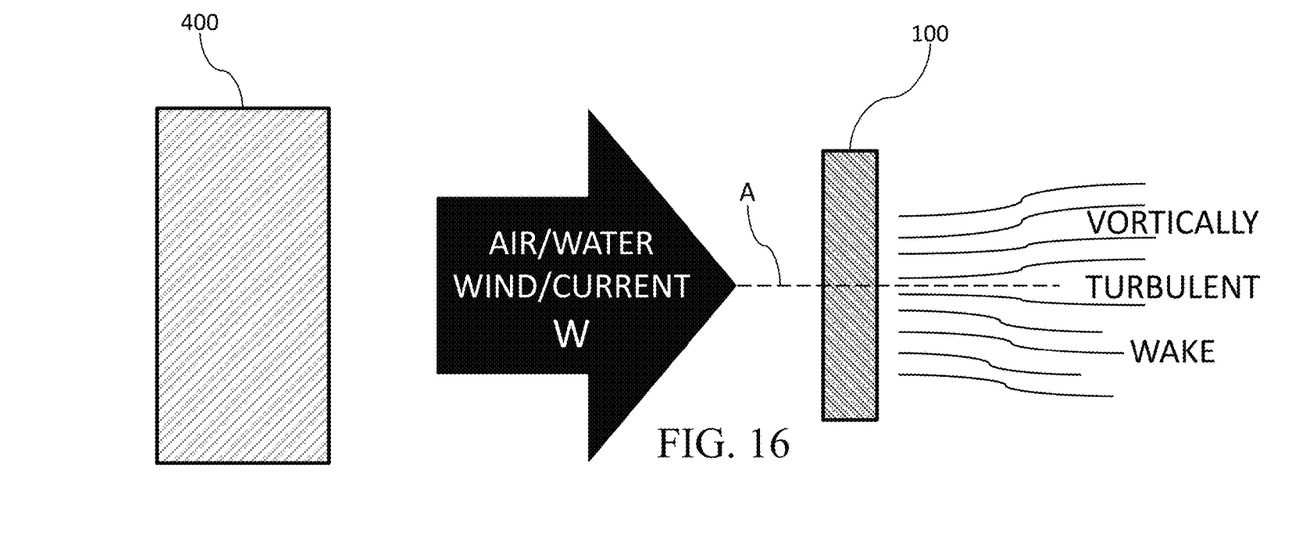
FIG. 16 is a diagram of an inventive embodiment such as shown in FIG. 1, illustrating in perspective view a vortices-dominant wake resulting from wind or current passing through the inventive embodiment in the direction of central axis A.

The CAD drawings of FIGS. 1, 15, and 17-20 depict same or similar examples of an inventive apparatus 100. Housing 110 is a frame or outer shell that supports four independent lifting surfaces 120. When placed in the freestream and uniform velocity field W produced by a wind or water producer 400 of a wind or water tunnel, such as illustrated in FIG. 16, or produced according to a computational method, each lifting surface 120 can produce a tip 121 vortex. The symmetry of the cross-section of each lifting surface (foil 120) implies that, at zero angle to the relative wind, the lifting surface 120 will not produce an appreciable tip vortex. By changing the relative angle of attack of each lifting surface 120, the strength and direction of rotation of each tip vortex can be independently varied.

Figure 17:
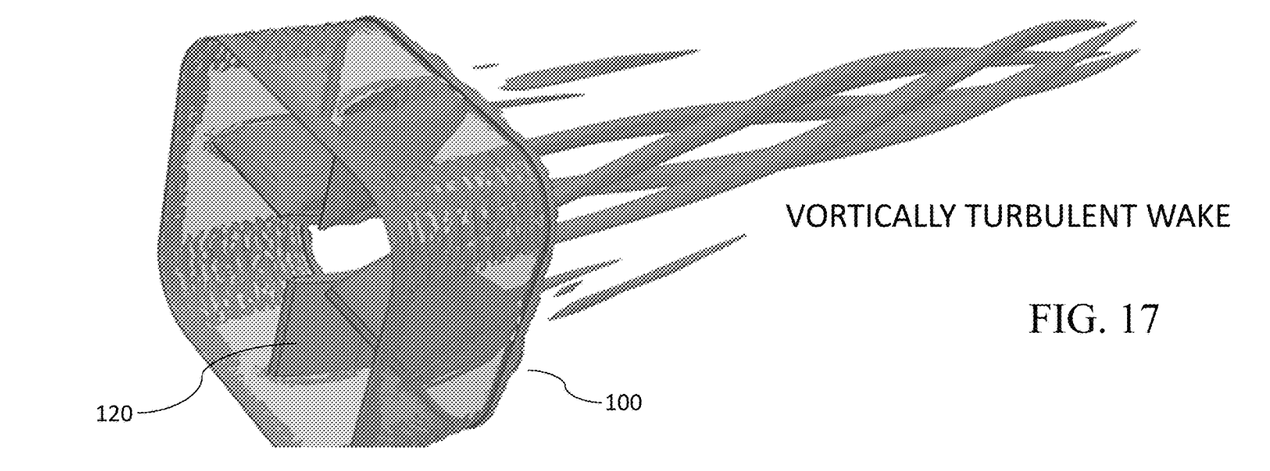
FIG. 17, FIG. 18, FIG. 19, and FIG. 20 are views similar to that shown in FIG. 15.
Figure 18:
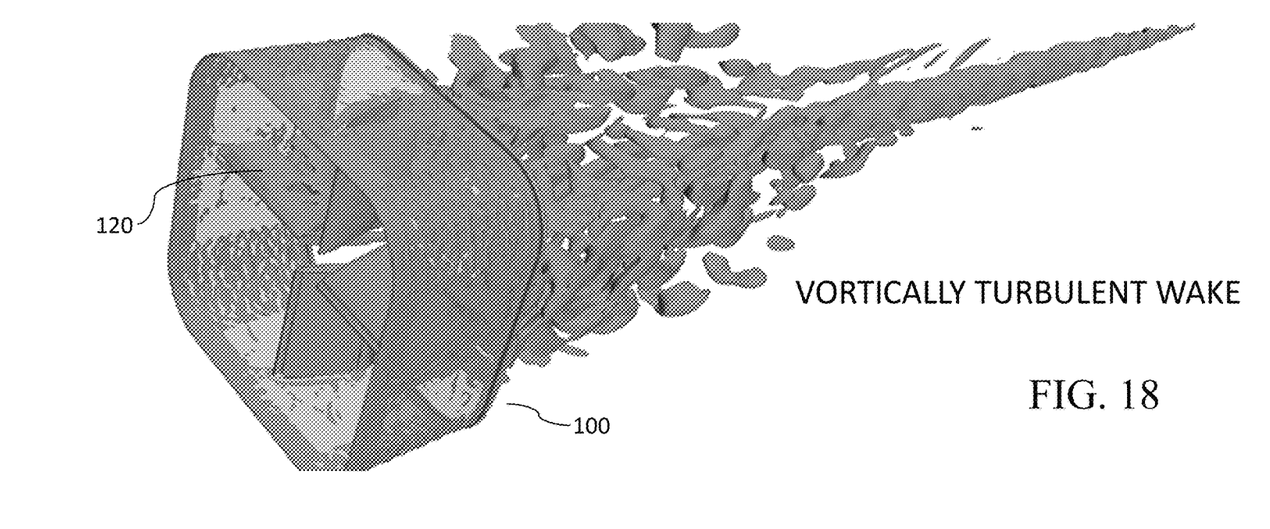
Figure 19:
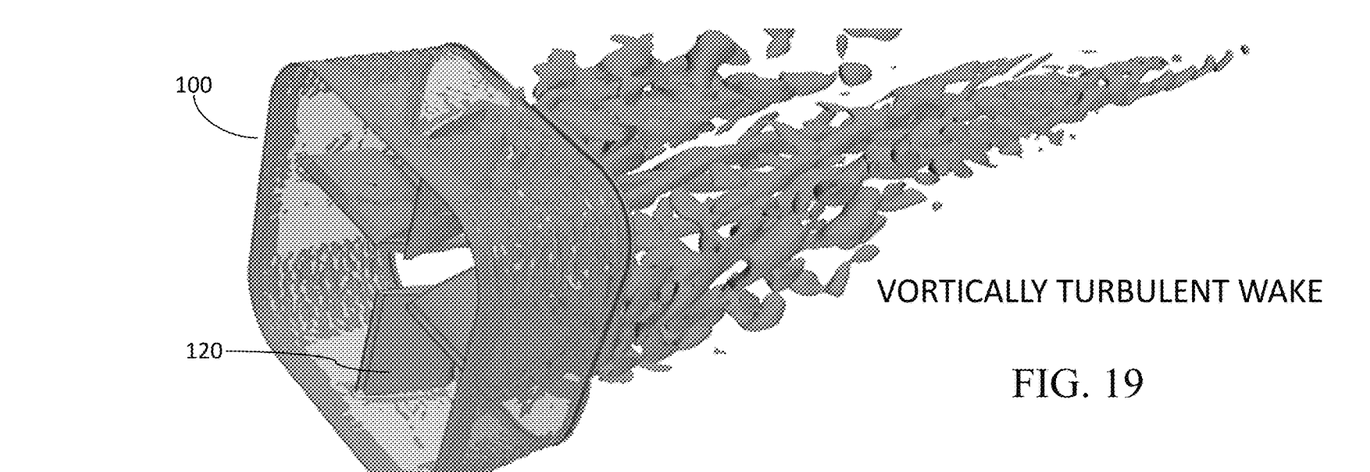
Figure 20:
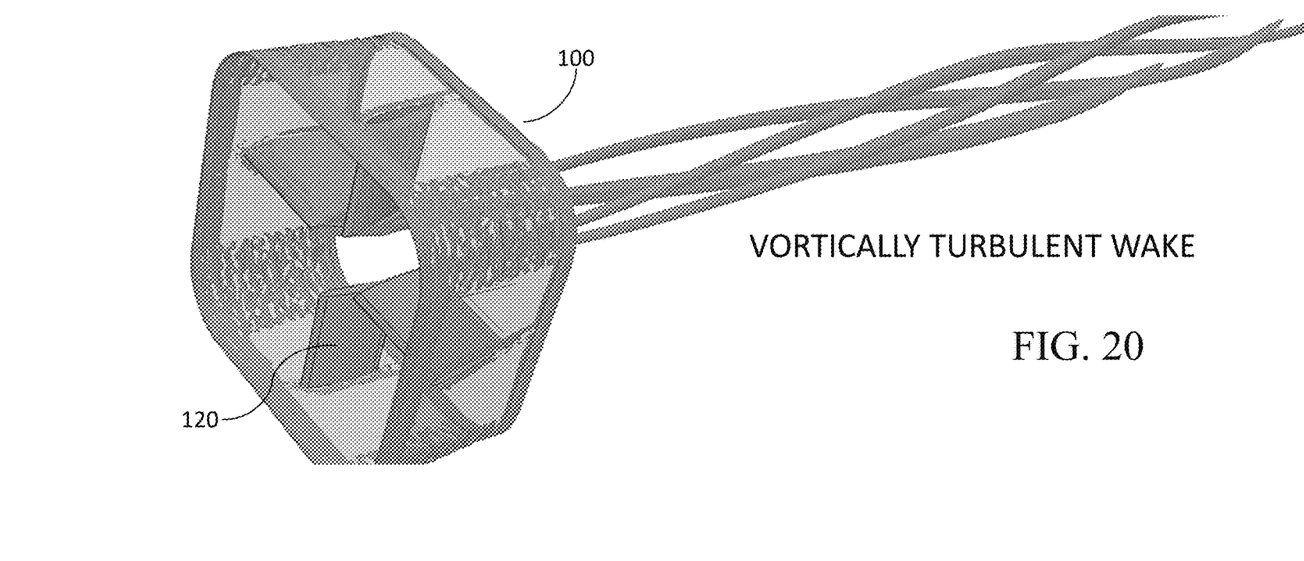

FIG. 17 shows an example wherein the inventive device 100 is configured with six-inch spacing between foil 120 surfaces, and the vortex strength is constant. FIG. 18 shows an example wherein the inventive device 100 is configured with three-inch spacing between foil 120 surfaces, and the vortex strength is constant. FIG. 19 shows an example wherein the inventive device is configured at twenty degree angles of attack, with constant spacing between foil surfaces. FIG. 20 shows an example wherein the inventive device is configured at ten degree angles of attack, with constant spacing between foil surfaces.

Figures 21, 22:
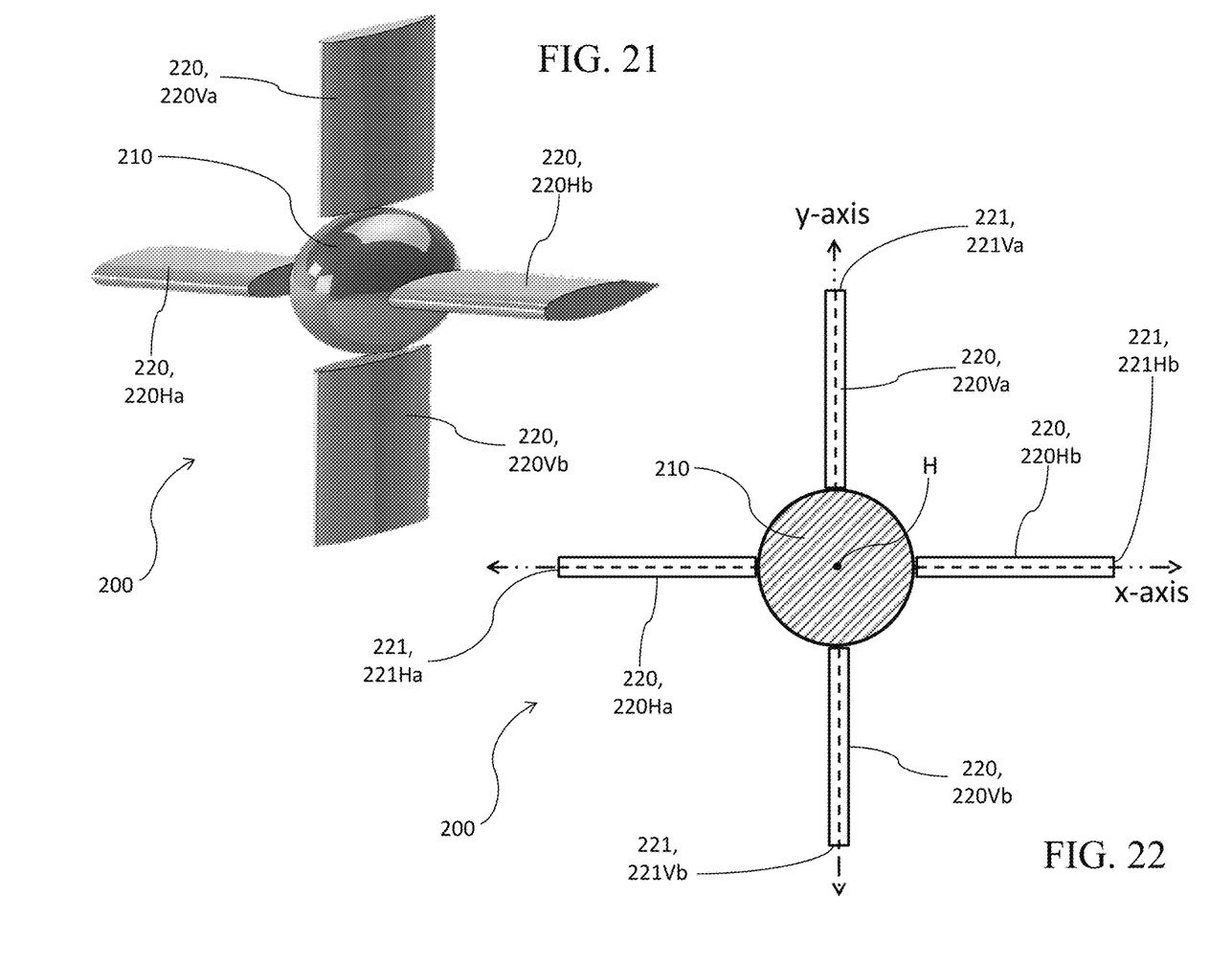

As described hereinabove, an exemplary mode of inventive practice provides a housing 110 from which four perpendicular foils 120 inwardly project toward a geometric center point or center line C. Now referring to FIGS. 21 and 22, a different mode of inventive practice provides an axisymmetric hub 210 from which four perpendicular foils 220 outwardly project, geometrically projecting from the center or longitudinal axis H of hub 210. As shown in FIGS. 21 and 22, the four foils 220 of inventive fluid-dynamic test device 200 are upper vertical foil 220Va (which has foil tip 221Va), lower vertical foil 220Vb (which has foil tip 221Vb), lefthand horizontal foil 220Ha (which has foil tip 221Ha), and righthand horizontal foil 220Hb (which has foil tip 221Hb). Hub 210 is centrally placed between all four perpendicular lifting surfaces 210, thus obviating the need for an outer support structure such as housing 110 shown in FIGS. 1 through 3.

The first mode of inventive practice (illustrated by way of example in FIGS. 1 through 3 and some other figures in the accompanying drawings) is general preferred vis-à-vis the second mode of inventive practice (illustrated by way of example in FIGS. 21 and 22). There are similarities between the first inventive mode one and the second inventive mode; in particular, both modes of inventive practice are capable of generating up to four vortices in accordance with inventive principles. However, spacing and vortex distancing between the four perpendicular foils can be effected according to the first inventive mode in ways that are not easily accomplished according to the second inventive mode. Moreover, according to exemplary second mode practice of the present invention, hub 210 will tend to cause undesirable interference effects between all of the tip vortices.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for fluid dynamic testing, the apparatus comprising four fluid foils and a housing for said four fluid foils, each said fluid foil characterized by a fluid foil axis about which said fluid foil is pivotable, said housing characterized by a Cartesian geometric plane having an x-axis and a y-axis that intersect at a center point, two of said fluid foils situate whereby the corresponding said fluid foil axis coincides with said x-axis, two of said fluid foils situate whereby the corresponding said fluid foil axis coincides with said y-axis.

2. The apparatus for fluid dynamic testing as recited in claim 1, wherein each said fluid foil is pivotable within a range selected from:
   a range of 180°;
   a range of less than of 180°;
   a range of 360°;
   a range greater than 180° and less than 360°.

3. The apparatus for fluid dynamic testing as recited in claim 1, each said fluid foil having a fluid foil tip and projecting inward from said housing toward said center point, said fluid foil tip being the nearest portion of said fluid foil to said center point, wherein the corresponding said fluid foil tips of said four fluid foils are at least approximately at the same distance from said center point.

4. The apparatus for fluid dynamic testing as recited in claim 3, wherein each said fluid foil is pivotable within a range selected from:
   a range of 180°;
   a range of less than of 180°;
   a range of 360°;
   a range greater than 180° and less than 360°.

5. The apparatus for fluid dynamic testing as recited in claim 1, each said fluid foil having a fluid foil tip and projecting inward from said housing toward said center point, said fluid foil tip being the nearest portion of said fluid foil to said center point, wherein at least two said fluid foil tips are at a different distance from said center point.

6. The apparatus for fluid dynamic testing as recited in claim 5, wherein each said fluid foil is pivotable within a range selected from:
   a range of 180°;
   a range of less than of 180°;
   a range of 360°;
   a range greater than 180° and less than 360°.

7. A fluid dynamic testing device suitable for use in a fluid tunnel, the fluid dynamic testing device comprising a casing and four fluid foils attached to said casing, each said fluid foil being characterized by a fluid foil axis and being capable of rotation about said fluid foil axis, wherein the respective said fluid foil axes of said four fluid foils are coplanar and are arranged at right angles to each other, the respective said fluid foil axes of two said fluid foils being horizontally aligned, the respective said fluid foil axes of two said fluid foils being vertically aligned.

8. The fluid dynamic testing device of claim 7, wherein said casing is characterized by a geometric centroid, and wherein each said fluid foil protrudes inward from said casing with said fluid foil axis directed toward said geometric centroid.

9. The fluid dynamic testing device of claim 8, wherein:
   the fluid dynamic testing device is an aerodynamic testing device;
   the fluid tunnel is a wind tunnel;
   said fluid foils are airfoils;
   said fluid foil axes are airfoil axes.

10. The fluid dynamic testing device of claim 8, wherein:
    the fluid dynamic testing device is a hydrodynamic testing device;
    the fluid tunnel is a water tunnel;
    said fluid foils are hydrofoils;
    said fluid foil axes are hydrofoil axes.

11. The fluid dynamic testing device of claim 8, wherein each said fluid foil:
    has a leading edge and a trailing edge;
    is characterized by a fluid foil plane in which lie said leading edge, said trailing edge, and said fluid foil axis;
    is rotatably adjustable so that said fluid foil plane is in a horizontal position or in an oblique position.

12. The fluid dynamic testing device of claim 8, wherein each said fluid foil:
    has a leading edge and a trailing edge;
    is characterized by a fluid foil plane in which lie said leading edge, said trailing edge, and said fluid foil axis;
    is rotatably adjustable so that said fluid foil plane is in a horizontal position or in an oblique position or in a vertical position.

13. A vortex generation device comprising:
    a generally rectangular open frame including four members corresponding to four geometric sides of a rectangle, said frame characterized by a geometric frame plane, an interior space, and a geometric center lying in said geometric frame plane in said interior space, said interior space bounded by said four members, each said member characterized by a geometric midpoint;
    four foils each projecting into said interior space and characterized by a geometric axis lying in said geometric frame plane, each said foil connected to a different said member at said geometric midpoint whereby said geometric axis is perpendicular to said member and said foil is rotatable about said geometric axis.

14. The vortex generation device of claim 13, wherein each said foil is characterized by a geometric foil plane and is positionable in a range of rotation between ninety degree angularity of said geometric foil plane and zero degree angularity of said geometric foil plane, with respect to said geometric frame plane, and wherein according to said zero degree angularity said geometric foil plane coincides with said geometric frame plane.

15. The vortex generation device of claim 13, wherein each said foil is characterized by a geometric foil plane and is positionable in a range of rotation between right angularity of said geometric foil plane and an acute angularity of said geometric foil plane, with respect to said geometric frame plane.

16. The vortex generation device of claim 13, wherein said four foils are arranged in two pairs of coaxial said foils connected to opposite said members, a first said pair sharing a first said geometric axis, a second said pair sharing a second said geometric axis, the first said geometric axis and the second said geometric axis being perpendicular to each other and intersecting at said geometric center.

17. The vortex generation device of claim 16, wherein:
    said generally rectangular open frame is a generally square open frame;
    each said foil is characterized by a foil tip;

the four respective said foil tips are equidistant from said geometric center.

18. The vortex generation device of claim 17, wherein each said foil is characterized by a geometric foil plane and is positionable in a range of rotation between ninety degree angularity of said geometric foil plane and zero degree angularity of said geometric foil plane, with respect to said geometric frame plane, and wherein according to said zero degree angularity said geometric foil plane coincides with said geometric frame plane.

19. The vortex generation device of claim 17, wherein each said foil is characterized by a geometric foil plane and is positionable in a range of rotation between right angularity of said geometric foil plane and an acute angularity of said geometric foil plane, with respect to said geometric frame plane.

\* \* \* \* \*